United States Patent
Hashizume et al.

(10) Patent No.: US 7,130,502 B2
(45) Date of Patent: Oct. 31, 2006

(54) WAVELENGTH DIVISION MULTIPLEXING OPTICAL COUPLER

(75) Inventors: Hideki Hashizume, Somerset, NJ (US); Haiguang Lu, Somerset, NJ (US); Kenichiro Takeuchi, Somerset, NJ (US)

(73) Assignee: Nippon Sheet Glass Co., Ltd., Osaka (JP)

( * ) Notice: Subject to any disclaimer, the term of this patent is extended or adjusted under 35 U.S.C. 154(b) by 246 days.

(21) Appl. No.: 10/772,409

(22) Filed: Feb. 6, 2004

(65) Prior Publication Data

US 2005/0175276 A1    Aug. 11, 2005

(51) Int. Cl.
G02B 6/26 (2006.01)

(52) U.S. Cl. .......................... 385/24; 385/34
(58) Field of Classification Search ............ None
See application file for complete search history.

(56) References Cited

U.S. PATENT DOCUMENTS

| | | | |
|---|---|---|---|
| 4,474,424 A | | 10/1984 | Wagner |
| 4,707,064 A | * | 11/1987 | Dobrowolski et al. ........ 385/24 |
| 4,880,289 A | * | 11/1989 | Imoto et al. .................. 398/42 |
| 6,055,347 A | * | 4/2000 | Li et al. ........................ 385/34 |
| 6,188,816 B1 | * | 2/2001 | Solheim ....................... 385/24 |
| 6,198,857 B1 | * | 3/2001 | Grasis et al. ................. 385/24 |
| 6,597,837 B1 | | 7/2003 | Xiaofan |
| 6,760,085 B1 | | 7/2004 | Sato et al. |
| 6,816,645 B1 | * | 11/2004 | Tai ................................ 385/34 |
| 2002/0118920 A1 | * | 8/2002 | Francis et al. ................ 385/33 |
| 2003/0026540 A1 | | 2/2003 | Fukuzawa et al. |
| 2003/0035621 A1 | | 2/2003 | Kittaka et al. |

FOREIGN PATENT DOCUMENTS

| | | | | |
|---|---|---|---|---|
| JP | 54-17044 | | 2/1979 | |
| JP | 61-86715 A | * | 5/1986 | .............. 385/47 |

* cited by examiner

*Primary Examiner*—Rodney Bovemick
*Assistant Examiner*—Mike Stahl
(74) *Attorney, Agent, or Firm*—Whitham, Curtis, Christofferson & Cook, PC

(57) ABSTRACT

A wavelength division multiplexing optical coupler comprising an input optical fiber for a plurality of wavelengths; a lens for converting the light from the input optical fiber into a parallel light; a first optical filter group comprising optical filters aligned along the flux of parallel light so as to be fixed by angles different from each other such that fluxes of light in predetermined wavelength ranges are reflected in respective directions; and output optical fibers, to which the fluxes of light are coupled; wherein a second optical filter group for transmitting the predetermined wavelength ranges are arranged between the first face of the lens and the respective end faces of the set of the output optical fibers for coupling the fluxes of light reflected by the respective optical filters of the first optical filter group.

15 Claims, 3 Drawing Sheets

WAVELENGTH DIVISION MULTIPLEXING OPTICAL COUPLER

BACKGROUND OF THE INVENTION

1. Field of the Invention

The present invention relates to a wavelength division multiplexing coupler used in wavelength division multiplexing communication in an optical communication field, particularly relates to a wavelength division multiplexing optical coupler using an optical filter.

2. Related Art

There is PON (Passive Optical Network) as one of network systems used for FTTx (Fiber To The x, x=H: Home, P: Premise, C: Curb or the like) for introducing optical communication to a so-to-speak access system between a subscriber and a station. There are used fluxes of light having different wavelengths for upstream data from a subscriber to a station and downstream data from a station to a subscriber therefor. Further, there is also a case of multiplexing to use an analog signal of an image or the like having a further different wavelength. For example, there are used 1310 nm band for Upstream Data, 1490 nm band for Downstream Data and 1550 nm band for an image signal. Therefore, there is needed a wavelength division multiplexing optical coupler for multiplexing/demultiplexing the signals having the respective wavelengths in OLT (Optical Line Termination) or ONU (Optical Network Unit) provided on a station side and on a subscriber side.

Figure 6:
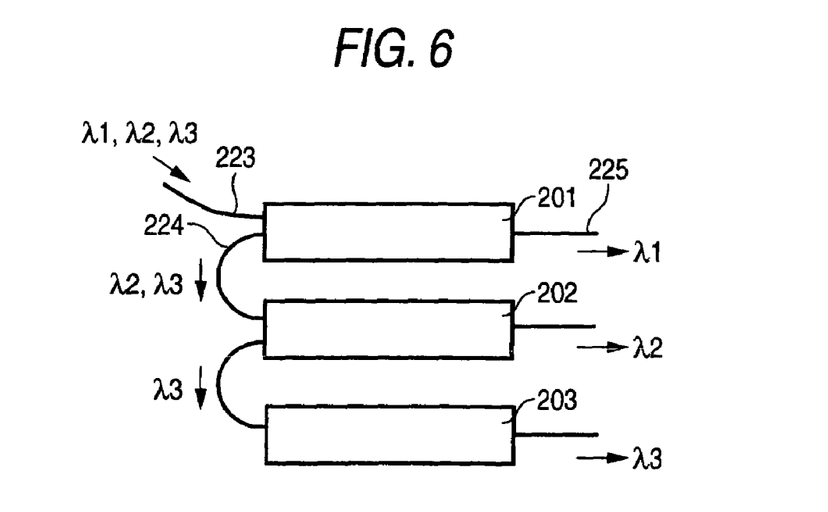
FIG. 6 is a schematic view showing a wavelength division multiplexing optical coupler of a background art.

In a background art, the wavelength division multiplexing optical coupler used for the above-described object is realized by a constitution as shown by FIG. 6. In order to multiplexing/demultiplexing three wavelengths $\lambda 1$, $\lambda 2$, $\lambda 3$, there are used three pieces of optical couplers 201, 202, 203 respectively having three kinds of band pass filters constituting transmission wavelength bands by three different wavelength bands which are connected in Cascade connection (refer to, for example, JP-A-54-17044). The optical coupler is referred to as 3 port coupler and when incident light multiplexed with two wavelengths is made to be incident from an optical fiber 223 constituting a common port (light incident port), fluxes of emitting light of two wavelength regions can respectively be outputted from optical fibers 224, 225 constituting two light emitting ports. By connecting the 3 port couplers in cascade connection, 3 or more wavelengths can be separated. Further, by increasing a number of the cascade connections, the function can be expanded to multiplexing/demultiplexing of 4 or more of wavelength bands. Further, the final optical coupler 203 can also be omitted.

As an inner constitution of the 3 port coupler, it is known to insert a band pass filter between a two-core collimator comprising two pieces of optical fibers and collimator lenses and a single core collimator comprising one piece of an optical fiber and a collimator lens, a type of inserting a band pass filter to a dividing portion of an optical wave guide divided in a Y-like shape or the like. There may be used an optical coupler having 2 kinds of edge filters (there is long wavelength transmitting type or a short wavelength transmitting type) having edge portions (wavelength edges) of transmitting wavelength bands at middles of three wavelength bands in place of a band pass filter.

A cross talk hampering amount (isolation) indicating to what degree is an amount of mixing light having a wavelength other than a predetermined wavelength band to each port of the optical coupler of the background art is normally about 12 dB owing to an influence of remaining reflection which is reflection which is not related to a wavelength characteristic of a filter in the case of a port utilizing reflected light of each filter and achieves at most about 18 db as a limit even when transmission ripples can pertinently be adjusted. Therefore, it is difficult to achieve high isolation (20 dB or higher) for all the channels.

Further, in order to connect two pieces (or three pieces) of couplers in cascade connection, it is necessary to lead around optical fibers and in that case, in order to prevent optical loss from being brought about, a winding radius of the optical fiber cannot be reduced to be equal to or smaller than a constant degree. Since a cabinet containing the optical fibers is needed, the coupler cannot be constituted by a shape of a small-sized tube as in the normal 3 port coupler but the coupler becomes large-sized.

Further, a number of parts is increased by an amount of a number of cascade connections of the 3 port couplers and cost is increased by that amount.

There is known an optical coupler overlappingly inserting a plurality of edge filters having different edge wavelengths in place of 1 sheet of the above-described optical filter as a measure for resolving the above-described problem (refer to, for example, U.S. Pat. No. 4,474,424). This is an optical coupler for coupling fluxes of light having different wavelengths to different optical fibers by changing directions of fluxes of reflected light from respective filters by respectively changing angles of respective optical filters. Thereby, separation of three wavelengths or more can be carried out by one optical coupler without connecting 3 port couplers in cascade connection and the above-described problem of large-sized formation or an increase in the number of parts can be resolved.

However, according to the above-described constitution, basically, fluxes of reflected light by the respective optical filters are utilized and therefore, the problem that only isolation of about 12 dB can be achieved normally owing to remaining reflection cannot be resolved.

SUMMARY OF THE INVENTION

The invention has been carried out in order to resolve the above-described problem and it is an object thereof to provide a wavelength division multiplexing optical coupler having high isolation, which is small-sized and inexpensive and capable of being used for separating a number of wavelengths of 3 or more wavelengths.

When a wavelength multiplexing signal multiplexed with optical signals having a plurality of wavelengths is incident from one piece of an input optical fiber, a wavelength division multiplexing optical coupler of the invention is provided with a function of separating (demultiplexing) the wavelengths to distribute to a plurality of output optical fibers and is constituted by the following elements:

An input output optical fiber multiplexed with a plurality of wavelengths from an end face thereof; and A lens for converting a flux of light emitted from the optical fiber into a flux of parallel light.

A first optical filter group comprising a plurality of optical filters aligned such that transmitting wavelength ranges thereof are successively narrowed along a direction of advancing the flux of parallel light. Incidentally, the respective filters of the optical filter group are fixed by angles different from each other relative to an optical axis of the lens such that fluxes of light in predetermined wavelength ranges included in the flux of parallel light are reflected respectively in predetermined directions. A set of output optical fibers end faces of which are arranged at positions at which fluxes of parallel light reflected by the respective optical filters are focused by the lens.

In the wavelength division multiplexing optical coupler having such a constitution, a second optical filter group for transmitting the predetermined wavelength ranges is arranged between the first face of the lens and respective end faces of the set of the output optical fibers for coupling fluxes of light reflected by the respective optical filter of the first optical filter group.

Although a basic function of the wavelength division multiplexing optical coupler is achieved by the first filter group, by providing the second optical filter group, remaining reflection components of the first filter group can be removed and therefore, isolation among the wavelengths can be promoted.

It is preferable that the lens is a gradient index rod lens and it is preferable that the input optical fiber and the set of the output optical fibers are held such that optical axes thereof are in parallel with each other.

By adopting such a constitution, the optical axis of the optical coupler can be arranged substantially on a straight line and the optical coupler which is small-sized and facilitating integration thereof can be provided.

It is preferable that the optional filter of the first optical filter group arranged to a side mostly proximate to the lens is brought into close contact with an end face of the lens.

An end face of the gradient index rod lens for making light incident thereon and emitting light can be constituted by a plane and therefore, it is easy to bring the optical filter in a flat plate shape into close contact with the plane. Further, it is easy to work the end face of the rod lens to be inclined to the optical axis and by bringing the optical filter into close contact with the end face, an angle thereof can easily be adjusted. Further, by using the lens with the filter in which the optical filter and the lens are brought close contact with each other, a number of parts is reduced and integration of the optical coupler can be facilitated.

Further, it is preferable to constitute the optical filter by a dielectric multilayer film to directly form on the end face of the gradient index rod lens.

By directly forming the optical filter on the end face of the lens, it is easy to mass-produce the lens with filter.

Further, it is preferable to constitute at least portions of the optical filters of the second optical filter group by dielectric multilayer films to directly form at portions of an end face of the lens on a side opposed to the end face brought into close contact with the optical filter belonging to the first optical filter group or directly form at end faces of the respective output optical fibers.

By directly forming the second optical filter group also to the lens or the end faces of the output optical fibers, integration of the wavelength division multiplexing optical coupler is considerably facilitated.

It is preferable to hold the input optical fiber and the set of the output optical fibers by a holding member (a capillary or a ferrule or the like) having a plurality of parallel fine holes along a longitudinal direction thereof.

By constituting such a so-to-speak multi core optical fiber pigtail, handling and alignment of the optical fiber is facilitated.

It is preferable to add the following elements in addition to the above-described constituent elements:

A lens for focusing fluxes of light transmitted through all of the optical filters of the first optical filter group; and An output optical fiber an end face of which is arranged at a position at which the fluxes of focused light are coupled.

Thereby, also light transmitted through all of the optical filters of the first optical filter group can also be utilized.

It is preferable to constitute the lens in this case by a gradient index rod lens and bring the optical filter of the first optical filter group arranged to a side mostly proximate to the lens into cross contact with an end face of the lens and it is preferable to directly form a dielectric multilayer film thereon similar to the above-described.

It is easy to work the end face of the gradient index rod lens to incline relative to the optical axis similar to the above-described and therefore, the angle of the optical filter is easy to set by brining the optical filter into close contact with the end face. Further, a number of parts can be reduced and the integration can be facilitated.

It is preferable to hold the output optical fiber by a holding member having a fine hole along a longitudinal direction thereof. Thereby, alignment of the optical fiber is facilitated.

It is preferable to constitute a wavelength division multiplexing optical coupler having two pieces of output optical fibers provided in parallel with an input optical fiber for multiplexing/demultiplexing three wavelengths as follows.

A first optical filter for transmitting fluxes of light having a first and a second wavelength and reflecting a flux of light having a third wavelength is directly formed at an end face of a first gradient index rod lens.

A light incident face of a second optical filter for transmitting the flux of light having the first wavelength and reflecting at least the flux of light having the second wavelength is fixed to the end face of the first lens brought into close contact with the first filter by angles different from each other relative to an optical axis of the lens.

An end face of a third output optical fiber is arranged at a position at which the flux of light having the third wavelength reflected by the first optical filter is focused via the first lens.

A third optical filter for transmitting the flux of light having the third wavelength and reflecting the fluxes of light having the first and the second wavelength is directly formed at the end face of the third output optical fiber and/or a portion of an end face of the first lens opposed to the end face for passing the flux of light having the third wavelength;

An end face of a second output optical fiber is arranged at a position at which the flux of light having the second wavelength reflected by the second optical filter is focused via the first optical filter and the first lens.

A fourth optical filter for transmitting at least the flux of light having the second wavelength and reflecting the flux of light having the first wavelength is directly formed at a portion of the end face of the second output optical fiber and/or an end face of the first lens opposed to the end face for passing the flux of light having the second wavelength.

An and face of a first output optical fiber is arranged at a position at which the flux of light having the first wavelength transmitted through the first and the second optical filters is focused via the second lens.

By the above-described constitution, a wavelength division multiplexing optical coupler, which is small-sized and has a high isolation characteristic applicable to light multiplexed with three wavelengths, can be provided at low cost.

It is preferable to constitute an end face of the second lens on a side opposed to the first lens by a predetermined angle relative to the optical axis and to directly form the second optical filter directly at the end face.

When the second optical filter is also formed directly at the end face of the lens, a number of parts can further be reduced and the integration can also be facilitated.

The three wavelengths are constituted to include respectively wavelength ranges of 1260 through 1360 nm, 1480 through 1500 nm and 1550 through 1560 nm. By selecting the wavelength ranges, upstream and downstream data and the analog image signal for FTTx can be transmitted by wavelength ranges adapted to an existing optical fiber network.

It is preferable to constitute a wavelength division multiplexing optical coupler having three pieces of output optical fibers provided in parallel with an input optical fiber for multiplexing/demultiplexing four wavelengths.

The wavelength division multiplexing optical coupler is constituted by a first lens with a filter for bringing a first optical filter for transmitting fluxes of light having a first, a second and a third wavelength and reflecting a flux of light having a fourth wavelength into close contact with an end face of a first lens, a second lens with a filter for bringing a second optical filter for transmitting the flux of light having the first wavelength and reflecting at least the flux of light having the second wavelength into close contact with the end face of the second lens, and an optical filter chip arranged between the end faces of the first and the second ranges formed with the first and the second optical filters for transmitting the fluxes of light having the first and the second wavelengths and reflecting at least the flux of light having the third wavelength and the end faces brought into close contact with the respective optical filters and the light incident face of the optical filter chip are respectively provided with angles different from each other relative to the optical axis of the first lens.

An end face of a fourth output optical fiber is arranged at a position at which the flux of light having the fourth wavelength reflected by the first optical filter is focused via the first lens.

A fourth optical filter for transmitting the flux of light having the fourth wavelength and reflecting the fluxes of the light having the first, the second and the third wavelengths is directly formed at the end face of the fourth output optical fiber and/or a portion of the end face of the first lens opposed to the end face for passing the flux of light having the fourth wavelength.

A second output optical fiber is arranged at a position at which the flux of light having the second wavelength reflected by the second optical filter is transmitted through the first optical filter and focused via the first lens.

A sixth optical filter for transmitting at least the flux of light having the second wavelength and reflecting the flux of light having the first wavelength is directly formed at the end face of the second output optical fiber and/or a portion of the end face of the first lens opposed to the end face for passing the flux of light having the second wavelength.

A third output optical fiber is arranged at a position at which the flux of light having the third wavelength reflected by the optical filter chip is transmitted through the first optical filter and focused via the first lens.

A fifth optical filter for transmitting at least the flux of light having the third wavelength and reflecting the fluxes of light having the first and the second wavelengths is directly formed at the end face of the second output optical fiber and/or a portion of the end face of the first lens opposed to the end face for passing the flux of light having the third wavelength.

An end face of the first output optical fiber is arranged at a position at which the flux of light having the first wavelength transmitting through the first, the second and the third optical filters is focused via the second lens.

By the above-described constitution, a wavelength division multiplexing optical coupler which is small-sized and having a high isolation characteristic applicable to light multiplexed with four wavelengths can be provided at low cost.

It is preferable that the optical filters of the first and the second changes with filters are dielectric multilayer films and at least either thereof is directly formed at the end face of the lens.

Thereby, even in the wavelength division multiplexing optical coupler for separating four wavelengths, a number of parts can be reduced, the integration can be facilitated and the wavelength division multiplexing optical coupler can be provided at low cost.

According to the invention, a wavelength division multiplexing coupler having a high isolation characteristic and used for multiplexing/demultiplexing 3 or more wavelengths can be provided. Further, a number of parts can be reduced and therefore, integration thereof is facilitated and cost can be reduced.

DETAILED DESCRIPTION OF THE PREFERRED EMBODIMENTS

A detailed explanation will be given of embodiments of the invention in reference to the drawings as follows. Further, the same members in the drawings are attached with the same notations and an explanation thereof may be omitted.

First Embodiment

Figure 1:
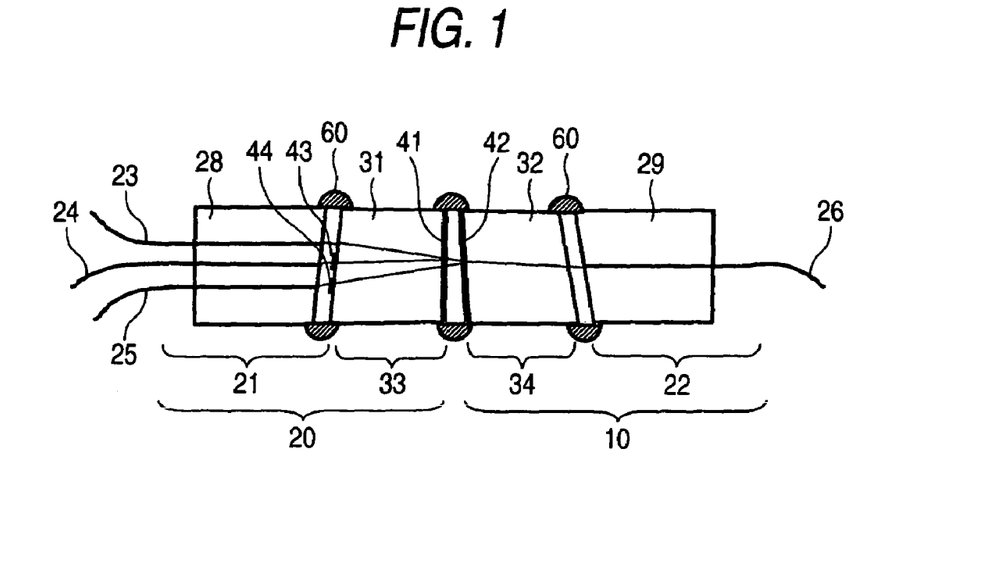
FIG. 1 is a schematic sectional view showing an embodiment of a wavelength division multiplexing optical coupler for three wavelengths according to the invention.

FIG. 1 shows a structure of a first embodiment of a wavelength division multiplexing optical coupler according to the invention. According to the optical coupler, an optical signal multiplexed with three wavelengths, 1310, 1490, 1550 nm is made incident from an optical fiber 23 (common port) for incident light, signals of 1310 nm and 1490 nm are emitted respectively from optical fibers 24, 25 (second, third ports) for emitting light and a signal of 1550 nm is emitted from an optical fiber 26 (first port) for emitting light. An explanation will be given by setting a first wavelength $\lambda 1$ to 1550 nm, a second wavelength $\lambda 2$ to 1490 nm and a third wavelength $\lambda 3$ to 1310 nm as follows.

Three pieces of optical fibers of the optical fiber 23 for incident light and the optical fibers 24, 25 for emitting light are held by a capillary 28 provided with fine through holes in cylindrical glass such that optical axes thereof are in parallel with each other to constitute a three-core optical fiber pigtail 21. A first gradient index rod lens 31 is arranged to be opposed to an end face of the three-core optical fiber pigtail 21.

It is preferable that end faces of the three-core optical fiber pigtail 21 and the gradient index rod lens 31 are inclined relative to the optical axes by about 4 through 8° such that fluxes of reflected light at the end faces do not return to the optical fibers, and it is preferable in view of integration that the two end faces are substantially in parallel with each other.

The gradient index rod lens 31 serves to convert light emitted from the optical fiber 23 into parallel light and focus parallel light incident from the end face on the opposed side to couple to the optical fibers 24, 25. That is, a three-core optical fiber collimator 20 is constituted by the three-core optical fiber pigtail 21 and the gradient index rod lens 31.

Similarly, one piece of the optical fiber 26 for emitting light is held by a capillary 29 to constitute a single core optical fiber pigtail 22. A second gradient index rod lens 32 is arranged to be opposed to an end face of the single core optical fiber pigtail 22. It is preferable that also end faces of the single core optical fiber pigtail 22 and the gradient index rod lens 32 opposed to each other are inclined relative to the optical axes and substantially in parallel with each other to prevent fluxes of reflected light from returning to the optical fibers.

The gradient index rod lens 32 serves to focus parallel light incident from an end face thereof on a side opposed to a side thereof opposed to the optical fiber pigtail to couple to the optical fiber 26. That is, a single core optical fiber collimator 10 is constituted by combining the single core optical fiber pigtail 22 and the gradient index rod lens 32.

The three-core optical fiber collimator 20 and the single core optical fiber collimator 10 are arranged by making the gradient index rod lenses (hereinafter, simply referred to as lenses) 31 and 32 to be opposed to each other such that fluxes of parallel light can be coupled.

Figure 2A:
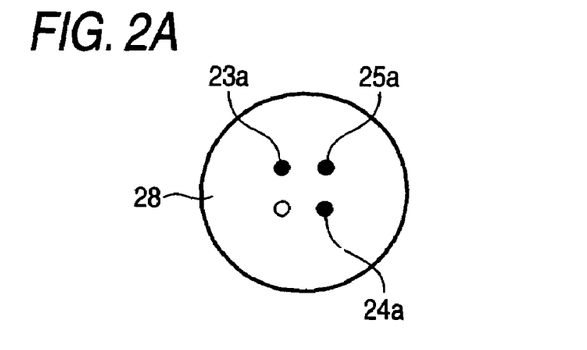
FIGS. 2A and 2B illustrate schematic views showing an example of a mode of a second group of optical filters.
Figure 2B:
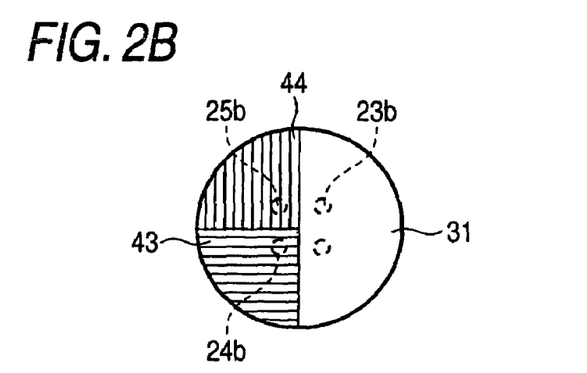

There are used a total of 4 sheets of optical edge filters classified into two groups depending on positions thereof to be arranged in the optical coupler of the invention. As shown by FIG. 1, a first group of optical filters 41, 42 are provided between the lens 31 and the lens 32. A second group of optical filters 43, 44 are provided between the first lens 31 and the optical fibers 24, 25 for emitting light. In the case of the embodiment, films of the optical filter 41 and the optical filters 43, 44 of the second group are formed directly on the two end faces of the lens 31 and a first filter 33 integrated with filters. It is necessary that the optical filter 43 is operated only to light coupled to the optical fiber 24, the optical filter 44 is operated only to light coupled to the optical fiber 25, respectively, and the optical filters 43 and 44 are not operated to light incident from the optical fiber 23. The films are formed to cover at least positions 24b, 25b (illustrated circular marks are indicated with an object of explanation and are not actually present) on the end face of the lens 31 opposed to end faces 24a, 25a of the optical fibers 24, 25 on the end face of the capillary 28 as shown in FIG. 2A. According to the embodiment, as shown by FIG. 2B, the films of the filters 43, 44 are formed to cover only quarters of the end face of the lens 31.

The optical filter 42 is also formed directly on the end race or the lens 32 to constitute a lens with a second filter 34.

Here, the optical filter 41 belonging to the first group transmits $\lambda 1$, $\lambda 2$ and reflects $\lambda 3$. Although the optical filter 41 is designed such that fluxes of transmitted light having the wavelengths $\lambda 1$, $\lambda 2$ can achieve isolation equal to or larger than 40 dB relative to reflected light, the isolation is about 12 dB since remaining reflection components of $\lambda 1$, $\lambda 2$ are present in the reflected light having the wavelength of $\lambda 3$.

Further, the optical filter 42 transmits $\lambda 1$ and reflects at least $\lambda 2$. A characteristic thereof with regard to $\lambda 3$ is not particularly prescribed. This is because the optical filter 42 is arranged such that transmitted light of the optical filter 41 is incident thereon and therefore, light of $\lambda 3$ is reflected by the optical filter 41 and hardly reaches the optical filter 42 and therefore, no problem is posed thereby. Isolation of transmitted light and reflected light is made to be similar to that of the optical filter 41.

Meanwhile, the optical filter 43 belonging to the second group reflects $\lambda 1$, $\lambda 2$ and transmits $\lambda 3$. A characteristic of the optical filter may be inferior to that the optical filters 41, 42 and isolation of transmitted light is made to be less than 30 dB to achieve a isolation condition of >40 dB. As the reflection isolation by the optical filters 41, 42 have been already provided for the reflected light, an inexpensive filter having isolation of less than 30 dB is sufficient for the second group of filters 43, 44. Further, the optical filter 44 reflects $\lambda 1$ and transmits $\lambda 2$. A characteristic thereof with regard to $\lambda 3$ is not prescribed by reason similar to the above-described. An isolation characteristic thereof is made to be similar to that of the optical filter 43.

A lift-off method is used in order to form a dielectric multilayer film for an optical filter at a portion of the end face of the lens as described above. That is, a portion at which the dielectric film is not formed is coated with a resin or the like to mask and the dielectric film is formed thereon. Successively, the resin at the matrix is dissolved by a solvent to remove along with the dielectric film to thereby adhere the dielectric multilayer optical filter only at the portion of the end face. Further, the end face of the lens is provided with an antireflection film before forming the optical filter. The antireflection film is provided with a characteristic of making the reflectance to be equal to or smaller than 0.5% over an entire wavelength region from 1250 nm to 1650 nm. It is preferable to provide the antireflection film also on the side of the optical fiber pigtail.

Among the respective optical signals having wavelengths $\lambda 1$, $\lambda 2$, $\lambda 3$ incident from the optical fiber 23, the signal of $\lambda 3$ (1310 nm) is reflected by the optical filter 41 which is a long wavelength transmitting type optical filter (LWPF) and is incident on the optical fiber 24 arranged at a position diametrically opposed to the optical fiber 23. Although the reflected light includes fluxes of the remaining reflected light having wavelengths 1490 nm and 1550 nm of about −12 dB as described above, both of the fluxes are removed by isolation of about −28 dB by the optical filter 43 which is a short wavelength transmitting type optical filter (SWPF) selectively formed at an opposed face of the first lens 31 to block the end face of the optical fiber 24 and therefore, isolation equal to or larger than 35 dB can be ensured.

The optical fiber 24 is arranged diametrically to the optical fiber 23 for making optical paths thereof in the optical fiber collimator symmetrical with respect to the optical axis and thereby, alignment of two pieces of the optical fibers and the lens is facilitated and insertion loss can be minimized. Surroundings of the three-core optical fiber pigtail 21 and the lens with the filter 33 are fixed by an epoxy adhesive 60 while leaving small clearances at the optical paths.

Among fluxes of light transmitted through the optical filter 41, the flux of light of λ2 (1490 nm) is reflected by the optical filter 42 (LWPF), transmitted again through the optical filter 41 and thereafter transmitted through the optical filter 44 (SWPF) and coupled to the optical fiber 25. The signal passes the optical filter 41 twice and therefore, sufficiently large isolation can be ensured with regard to light having the wavelength of λ3 (1310 nm). Further, the remaining reflection of light of λ1 (1550 nm) in moved by the optical filter 44 with isolation of about −28 dB and isolation equal to or larger than 35 dB can be ensured with respect to λ2.

In order to align to couple the reflected light of the optical filter 42 to the optical fiber 25, an angle of the optical axis of the second lens 32 formed with the optical filter 42 (lens with a filter 34) is adjusted and thereafter, an outer peripheral portion of the lens with the filter 33 having the optical filter 41 is fixed by the adhesive while similarly leaving small clearances at the optical paths. Furthers in order to restrain inclination of the second lens 32 relative to the first lens 31 as small as possible, there is carried out a treatment of polishing by previously inclining the angle of the end face of the second lens 32 for forming the filter 42 by a certain degrees of angle relative to the optical axis of the lens.

Both of components of the fluxes of light transmitted through the optical filter 41 and the optical filter 42 in the wavelength regions of 1310 nm and 1490 nm are sufficiently attenuated by about 40 dB to constitute a flux of signal light having the wavelength of 1550 nm having isolation equal to or larger than 35 dB. The single core fiber pigtail is aligned such that the flux of light is coupled to the optical fiber 26 with minimum loss and the second lens 32 (lens with the filter) and the single core optical fiber pigtail 22 are fixed while leaving small clearances at optical paths. Characteristics of the respective optical filters and the characteristics of the respective ports are summarized to show in Table 1.

As to the third port corresponding to the optical fiber 25, the flux of light, which is transmitted thought the optical filter 41 and reflected by the optical filter 42 and is subsequently transmitted through the optical filter 41 again and the optical filter 44, is coupled to the third port. The optical filter 41 provides attenuation about 40 dB to the flux of light having the wavelength of λ3 at a transmission therethrough. The optical filter 41 provides attenuation about 40 dB attain to the flux of light reflected by the optical filter 42 with respect to the wavelength of λ3. Accordingly a sufficient isolation to the wavelength of λ3 is obtained at the third port. Meanwhile, the optical filter 42 provides attenuation with respect to the wavelength of λ1. Attenuation in the reflected flux of light at the optical filter 42 with respect to the wavelength of λ1 is not expected high values like 40 dB. It is just about 12 dB or a bit higher. Such the reflected flux of light at the optical filter 42 is transmitted through the optical filter 41 again, and transmitted through the optical filter 44, which provides further attenuation to the wavelength of λ1. As a result, the flux of light having the wavelength of λ2 is coupled to the third port with a sufficient isolation with respect to λ2.

As discussed above, Table 1 shows that sufficient isolation can be obtained at each of the first through third porte with respect to the corresponding wavelength λ1–λ3.

Incidentally, in aligning and fixing the second lens 32 on the side of the optical fiber 26 and the single core optical fiber pigtail 22, the angle of the lens 32 needs to adjust in aligning the optical fiber 25 and therefore, it is not advantageous to use the single core optical fiber collimator constituted by previously fixing the lens and the single core optical fiber pigtail. Because when the angle of the lens 32 is changed, a spot for focusing to the optical fiber 26 is also shifted and therefore, two of the angle and the position need to optimize simultaneously. As described in the above-described example, it is easy as operation to firstly fix the

TABLE 1

| Unit (dB) | first port (1550 nm) | | | second port (1310 nm) | | | third port (1490 nm) | | |
| --- | --- | --- | --- | --- | --- | --- | --- | --- | --- |
| wavelength | 1310 | 1490 | 1550 | 1310 | 1490 | 1550 | 1310 | 1490 | 1550 |
| filter 41 | >40 | 0.2 | 0.2 | 0.2 | >12 | >12 | >40 × 2 | 0.2 | 0.2 |
| filter 42 | — | >40 | 0.2 | | | | 0.2 | 0.2 | >12 |
| filter 43 | | | | 0.2 | >28 | >28 | | | |
| filter 44 | | | | | | | 0.2 | 0.2 | >28 |
| total | >40 | >40 | 0.4 | 0.4 | >40 | >40 | 80 | 0.6 | >40 |

As described above, to the first port which corresponds to the optical fiber 26, the flux of light that is transmitted through the optical filters 41 and 42 is coupled. The fluxes of light having the wavelengths of λ3 and λ2 are attenuated at 40 dB or more at the optical filters 41 and 42 by reflection. The flux of light having the wavelength of λ1 is coupled to the first port with a sufficient isolation with respect to λ1.

To the second port which corresponds to the optical fiber 24, the flux of light that is reflected by the optical filter 41 and is transmitted through the optical filter 43 is coupled. At the optical filter 41, the fluxes of light having wavelengths of λ2 and λ1 are attenuated about 12 dB respectively. Incidentally, due to the nature of such the optical films, the characteristic to the isolation is generally inferior in the reflected flux of light as compared to the transmitted flux or light. In the flux of light reflected by the optical filter 41, a flux of light that is transmitted through the filter 43, so that the flux of light having the wavelength of λ3 is coupled to the second port with a sufficient isolation with respect to λ3.

lens 32 and successively fix the pigtail 22. Therefore, in the case of the embodiment, it is preferable to finish to align to fix all the parts and thereafter cover a case for protection to constitute a final mode. For one of the examples as an outer configuration of a package, the diameter is 5.5 mm and the length is about 40 mm. The invention may be realized by a compact tube packaging such as several millimeter diameter and a couple of tem millimeter length.

As a result, a four-port type three-wavelength WDM coupler having insertion losses of all the ports equal to or smaller than 1.0 dB and isolation equal to or larger than 35 dB can be realized.

According to the embodiment, in order to facilitate to selectively form the optical filters 43, 44, with regard to the three-core optical fiber pigtail, three holes in the four-hole glass capillary in a line symmetric rectangular arrangement are used. Thereby, an edge of the optical filter can be constituted by a linear shape and masking for lift-off is facilitated. When intervals among the holes fall in a range of 150 through 250 μm, excellent filter arrangements can be realized without interfering with the respective cores.

In the above-described example, the wavelength transmitted to the optical fiber 26 can be made to be 1310 nm or 1490 nm. Further, each optical filter can also be constituted by using a band pass filter. Naturally, wavelengths used are not limited the three wavelengths of the above-described example. For example, respective wavelengths can be selected within wavelength ranges of 1260 through 1360 nm, 1480 through 1500 nm, and 1550 through 1560 nm.

The optical filters 43, 44 may be constituted by any shape so far as the shapes respectively operate only to the fluxes of light coupled to the optical fibers 24, 25 and are not operated to light incident from the optical fiber 23 and are not limited to shapes of covering quarters of the end face as described above.

Further, it is not necessarily needed to form the optical filters 43, 44 at the end face of the lens 31. Both or either thereof may be formed at the end face of the three-core optical fiber pigtail 21, that is, the end faces of the optical fibers.

Second Embodiment

Figure 3:
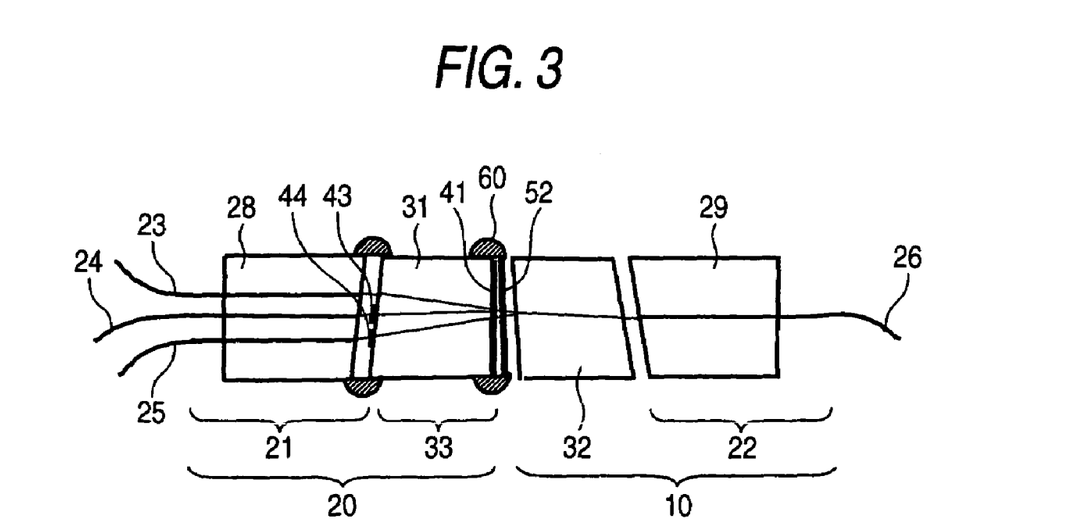
FIG. 3 is a schematic sectional view showing an embodiment of a wavelength division multiplexing optical coupler for three wavelengths or two wavelengths according to the invention.

Next, an explanation will be given of a second embodiment in reference to FIG. 3. It is not necessarily needed to form the film of the optical filter according to the first embodiment directly at the end face of the lens or the capillary and an optical filter chip can also be utilized. According to the embodiment, a film of an optical filter is not formed at the end face of the second lens but an optical filter chip is utilized.

In this case, although the reflected light of the optical filter 41 is similarly coupled and aligned to the optical fiber 24, thereafter, an optical filter chip 52 is held by a vacuum adsorbing jig and aligned such that loss of coupling reflected light thereof to the optical fiber 25 is minimized and thereafter, fixed to the lens with filter 33 the surrounding of which has already been formed with the optical filters 41, 43, 44 by the epoxy adhesive 60 to thereby form the three-core optical fiber collimator 20.

Figure 4:
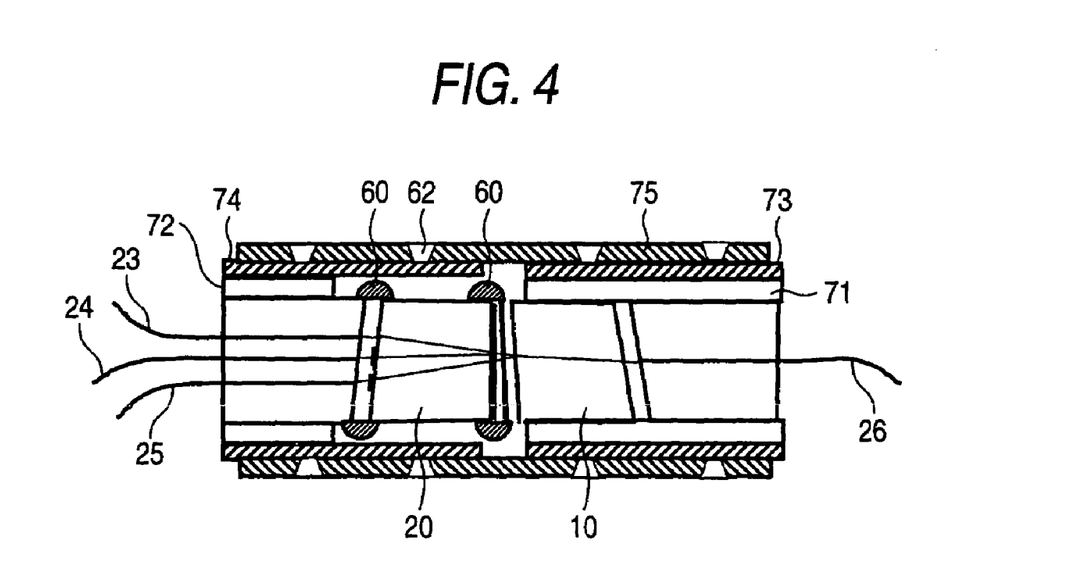
FIG. 4 is a schematic sectional view showing an example of an embodiment of a wavelength division multiplexing optical coupler for three wavelengths or two wavelengths according to the invention.

FIG. 4 shows a mode of integrating and mounting the wavelength division multiplexing optical coupler. The integration is carried out as follows. On the side of the single core optical fiber collimator 10, the lens 32 and the single core optical fiber pigtail 22 are aligned in the optical axis direction at inside of a glass tube 71 and thereafter fixedly adhered thereto and a metal tube 73 an outer peripheral face of which is plated with gold is covered thereon to adhere to thereby constitute the single core optical fiber collimator 10.

Meanwhile, on the side of the three-core optical fiber collimator 20 finished with aligning, the pigtail portion is covered with a glass tube 72 shorter than the pigtail portion and a metal tube 74 similar to that of the single core side is covered thereon to adhere. A portion of the metal tube 74 adhered with the lens and the pigtail is brought into a hollow state since the glass tube 72 serves as a spacer. The single core and the three-core optical fiber collimators 10, 20 are aligned at inside of a gold-plated metal tube 75 opened with a plurality of holes for fixing by solder such that coupling loss is minimized and thereafter fixedly sealed by a solder 62. Thereafter, silicone resin is filled into the metal tube 75 and end caps (not illustrated) are covered at both ends thereof to thereby finish a tube type package. As an outer configuration of the package, the diameter is 5.5 mm and the length is about 40 mm.

Similar to the first embodiment, a four-port type three-wavelength WDM coupler having insertion loss of all ports equal to or smaller than 1.0 dB and isolation equal to or larger than 35 dB can be realized.

Third Embodiment

An explanation will be given of a 4 wavelength division multiplexing optical coupler as a third embodiment in reference to FIG. 5. Also in this case, the coupler is provided with a function similar to that of the first or the second embodiment and can be integrated by a substantially similar procedure except that a number of wavelengths is 4 waves.

In the case of the optical coupler, an optical signal multiplexed by 4 wavelengths of 1310, 1490, 1550, 1625 nm is incident from an input optical fiber 123, 3 signals of 1310, 1490, 1550 nm are respectively emitted from output optical fibers 124, 125, 126 and a signal of 1625 nm is emitted from an output optical fiber 127. An explanation will be given as follows by setting the first wavelength $\lambda 1$ to 1625 nm, the second wavelength $\lambda 2$ to 1550 nm, the third wavelength $\lambda 3$ to 1490 nm and the fourth wavelength $\lambda 4$ to 1310 nm.

The input optical fiber 123 and three pieces of optical fibers of the output optical fibers 124, 125, 126 are held by a capillary 128 such that optical axes thereof are in parallel with each other to constitute a 4 core optical fiber pigtail 121. The gradient index rod lens 31 is arranged to be opposed to an end face of the 4 core optical fiber pigtail 121.

The lens 31 serves to convert a flux of light emitted from the optical fiber 123 into a flux of parallel light and focus the flux of parallel light incident from an end face on an opposed side to couple to the optical fibers 124, 125, 126. That is, a 4 core optical fiber collimator 120 is constituted by combining the 4 core optical fiber pigtail 121 and the lens 31.

Similarly, one piece of the output optical fiber 127 is held by the capillary 29 to constitute the single core optical fiber pigtail 22. The gradient index rod lens 32 is arranged to be opposed to the end face of the single core optical fiber pigtail 22.

A total of 6 sheets of optical edge filters or band pass filters classified into two groups depending on positions thereof to be arranged are used in the optical coupler of the invention. A first group of optical filters 141, 142, 152 are provided between the first lens 31 and the second lens 32 as shown by FIG. 5. A second group or optical filters 143, 144, 145 are provided between the first lens 31 and the output optical fibers 124, 125, 126. In the case of the embodiment, films of the optical filter 141 and the optical filters 143, 144, 145 are directly formed at the two end faces of the first lens 31 and integrated as a lens with filters. Incidentally, as shown by FIG. 5, the films of the optical filters 143, 144, 145 are formed to cover only portions (for example, quarter portions) of the end face of the first lens 31 to operate to only fluxes of light respectively coupled to the optical fibers 124, 125, 126. Also the film of the optical filter 142 is formed directly to the end face of the second lens 32 to constitute a lens with a filter. The optical filter 152 is an optical filter chip.

Here, the optical filter 141 belonging to the first group transmits $\lambda 1$, $\lambda 2$, $\lambda 3$ and reflects $\lambda 4$. Although the optical filter 141 is designed such that fluxes of transmitted light having the wavelengths of $\lambda 1$, $\lambda 2$, $\lambda 3$ achieve isolation equal to or larger than 40 dB with regard to fluxes of reflected light, since remaining reflection components of $\lambda 1$, $\lambda 2$, $\lambda 3$ are present at the reflected light having the wavelength $\lambda 4$ and therefore, isolation is about 12 dB.

Further, the optical filter 142 transmits λ1 and reflects at least λ2. A characteristic thereof with regard to λ3, λ4 is not particularly prescribed. Because the optical filter 142 is arranged such that fluxes of transmitted light of the optical filters 141, 152 are incident thereon and therefore, fluxes of light of λ3, λ4 are reflected by the optical filters 141, 152 and hardly reach the optical filter 142 and therefore, no problem is posed thereby. Isolation of transmitted light or the reflected light is made to be similar to that of the optical filter 141.

Further, the optical filter chip 152 transmits λ1, λ2 and reflects at least λ3. A characteristic thereof with regard to λ4 is not particularly prescribed. This is because the optical filter chip 152 is arranged such that transmitted light of the optical filter 141 is incident thereon and therefore, light of λ4 is reflected by the optical filter 141 and hardly reaches the optical filter chip 152 and therefore, no problem is posed thereby. Isolation of transmitted light or reflected light is made to be similar to that of the optical filter 141.

Meanwhile, the optical filter 143 belonging to the second groove reflects λ1, λ2, λ3 and transmits λ4. A characteristic of the optical filter may be inferior to those of the optical filters 141, 142 and isolation of transmitted light is made to be less than 30 dB. Further, the optical filter 144 reflects at least λ1, λ2 and transmits λ3. A characteristic thereof with regard to λ4 is not specified by reason similar to the above-described. An isolation characteristic thereof is made to be similar to that of the optical filter 143. The optical filter 145 reflects at least λ1 and transmits λ2. A characteristic thereof with regard to λ3, λ4 is not prescribed by reason similar to the above-described. An isolation characteristic thereof is made to be similar to that of the optical filter 143.

Among the respective optical signals having the wavelengths of λ1 through λ4 incident from the optical fiber 123, the signal of λ4 (1310 nm) is reflected by the optical filter 141 which is a long wavelength transmitting type optical filter (LWPF) and is incident on the optical fiber 124 arranged at a position diametrically opposed to the optical fiber 123. Although the reflected light includes fluxes of remaining reflection light having the wavelengths of λ1 through λ3 of about –12 dB, the fluxes are removed by the optical filter 143 which is a band pass optical filter (BPF) selectively formed at an opposed face of the first lens 31 to block the end face of the optical fiber 124 with isolation of about –28 dB and therefore, isolation equal to or larger than 35 dB can be ensured.

Surroundings of the 4 core optical fiber pigtail and the lens with filters are fixed by an epoxy adhesive while leaving small clearances at optical paths.

Among fluxes of light transmitted through the optical filter 141, a flux of light having the wavelength of λ3 (1490 nm) is reflected by the optical filter chip 152 (LWPF) and transmitted again through the optical filter 141 and thereafter transmitted through the optical filter 144 (BPF) to couple to the optical fiber 125. The signal is twice transmitted through the optical filter 141 and therefore, sufficiently large isolation can be ensured with regard to light having the wavelength λ4 (1310). Further, remaining reflection of fluxes of light having the wavelengths λ2 (1550 nm) and the λ1 (1625 nm) is removed by the optical filter 144 and isolation equal to or larger than 35 dB can be ensured.

Among fluxes of light transmitted through the optical filter chip 42, a flux of light having the wavelength λ2 (1550 nm) is reflected by the optical filter 142 (LWPF) and transmitted again through the optical filters 152, 141 and is transmitted through the optical filter 145 (BPF) to couple to the optical fiber 126. Since the signal is twice transmitted through the optical filters 141, 142, sufficiently large isolation can be ensured with regard to fluxes of light having the wavelengths of λ4 (1310 nm) and λ3 (1490 nm). Further, remaining reflection of light having the wavelength λ1 (1625 nm) is removed by the optical filter 145 and isolation equal to or larger than 35 dB can be ensured.

In order to align and couple a flux of reflected light of the optical filter chip 152 to the optical fiber 125, the optical filter chip is held by a vacuum adsorbing jig and aligned such that loss of coupling the flux of reflected light to the optical fiber 125 is minimized and thereafter, fixed to the lens 31 (lens with filters) the surrounding of which has already been formed with the optical filter 141 by the epoxy adhesive 60 while leaving small air gaps at optical paths.

Next, an angle of the optical axis of the second lens 32 (lens with filter) formed with the optical filter 142 is adjusted and thereafter, the second lens is fixed to an outer peripheral portion of the lens with filter which has already been adhered with the optical filter chip 152 by the epoxy adhesive 60 while similarly leaving small clearances at optical paths. Further, in order to restrain the inclination of the second end 32 relative to the first lens 31 as small as possible, there is carried out a treatment of polishing by previously inclining the angle of the end face of the second lens 32 formed with the optical filter 142 by 2 degrees relative to the optical axis of the lens.

Further, components of fluxes of light transmitted through the optical filters 141, 152 and 142 in a wavelength region of λ2 through λ4 are sufficiently attenuated to constitute a flux of signal light having the wavelength of λ1 (1625 nm) having isolation equal to or larger than 35 dB. The single core fiber pigtail 22 is aligned such that the flux of light is coupled to the optical fiber 127 with minimum loss and the second lens 32 (lens with filter) and the single core optical fiber pigtail 22 are fixed by the epoxy adhesive while leaving small clearances at optical paths.

All of the parts are fixed and thereafter contained at inside of the metal tube and the metal tube is filled with silicone resin. Both ends of the metal tube are sealed by end caps protecting the optical fibers to finish the wavelength division multiplexing optical coupler mounted to the tube type package.

Figure 5:
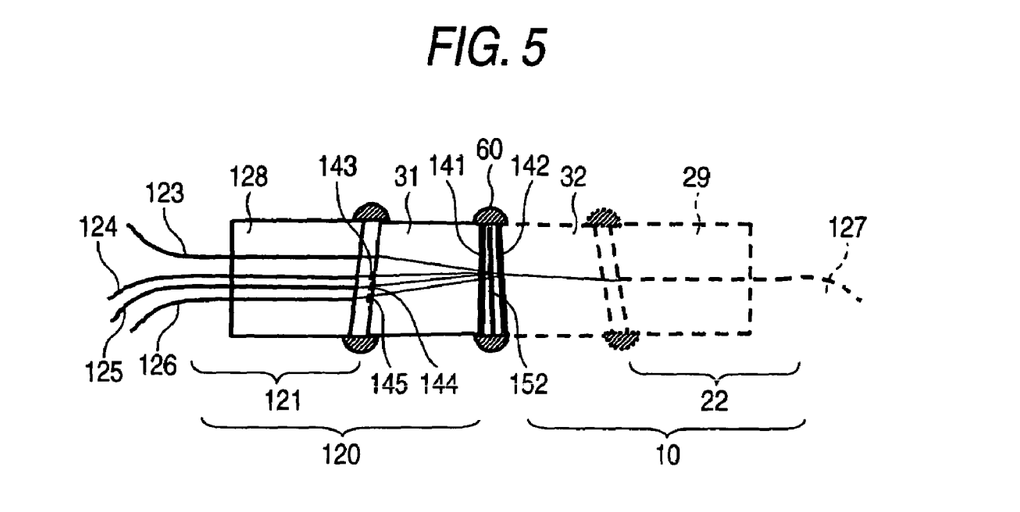
FIG. 5 is a schematic sectional view showing an embodiment of a wavelength division multiplexing optical coupler for 4 wavelengths according to the invention.

Further, in the case of the embodiment, a wavelength division multiplexing optical coupler for three wavelengths can also be constituted by a constitution omitting the single core optical fiber collimator at a portion shown by broken lines in FIG. 5. However, there is not provided a lens formed with the optical filter 142 and therefore, it is necessary to separately align the coupler by using an optical filter chip.

In the above-described example, a wavelength transmitted through the optical fiber 127 may be constituted by a wavelength other than 1550 nm. Further, the respective optical filters can also be constituted by using band pass filters. Naturally, wavelengths used are not limited to 4 wavelengths of the above-described example. For example, respective wavelengths can be selected from within wavelength ranges of 1260 through 1360 nm, 1460 through 1530 nm, 1530 through 1625 nm.

Further, it is not necessarily needed to form the optical filters 143, 144, 145 at the end face of the lens 31. Both or any one thereof may be formed at the end face of the three-core fiber pigtail 121, that is, end faces of the optical fibers.

Although an explanation has been given of the function of the optical demultiplexor for demultiplexing wavelength multiplexing light in any of the above-described embodiments of the wavelength division multiplexing optical coupler, an optical coupler having quite the same constitution can also be utilized as an optical multiplexor coupled to one piece of an optical fiber by multiplexing optical signals of 3 through 4 wavelengths. In this case, the input optical fiber in the above-described explanation becomes an output optical fiber and the respective output optical fibers become optical fibers for incident light.

Further, the wavelength division multiplexing optical coupler in the above-described embodiments is provided with the function of outputting 3 through 4 wavelengths to the different ports. However, by selecting characteristics of the optical filters, for example, an optical coupler for outputting both of signals having the wavelengths of 1310 nm and 1490 nm to the first port and the signal of 1550 nm to the second port, or an optical coupler for outputting only signals of two wavelengths of 1310 nm and 1490 nm respectively to separate ports even when the signal of three wavelengths is inputted or the like can similarly be realized.

Further, the wavelength division multiplexing optical coupler of the invention can not only be integrated to OLT, ONU but is applicable variously to other optoelectric (O/E) or electroptic (E/O) device.

What is claimed is:

1. A wavelength division multiplexing optical coupler comprising:
   an input optical fiber for emitting a flux of light multiplexed with a plurality of wavelengths from an end face thereof;
   a first lens having a first face into which the flux of light emitted from the input optical fiber is input, and a second face from which the flux of light converted into a flux of parallel light is emitted;
   a first optical filter group comprising a plurality of optical filters through which predetermined wavelength ranges of light are transmitted respectively aligned along a direction of advancing the flux of parallel light so as to be fixed on a side of the second face of the first lens by angles different from each other relative to an optical axis of the first lens such that fluxes of light in predetermined wavelength ranges included in the flux of parallel light are reflected respectively in predetermined directions;
   a set of output optical fibers, end faces of which are arranged at positions at which fluxes of parallel light arranged by the respective optical filters of the first optical filter group are focused respectively by input into the second face and emitted from the first face of the first lens;
   a second optical filter group for transmitting the predetermined wavelength ranges arranged between the first face of the first lens and the respective end faces of the set of the output optical fibers for coupling the fluxes of light reflected by the respective optical filters of the first optical filter group;
   a second lens having a third face from which a flux of light transmitting through all of the optical filters of the first optical filter group is input and a fourth face from which the flux of light is emitted; and
   at least one further optical fiber, an end face of which is arranged at a position of coupling the focused flux of light from the second lens.

2. The wavelength division multiplexing optical coupler according to claim 1, wherein the first lens is a gradient index rod lens having a first end face corresponding to the first face and a second end face corresponding to the second face and wherein the input optical fiber and the set of the output optical fibers are held such that optical axes thereof are in parallel with each other.

3. The wavelength division multiplexing optical coupler according to claim 2, wherein the optical filter of the first optical filter group arranged to a side mostly proximate to the second end face of the first lens is in close contact with the second end face of the first lens.

4. The wavelength division multiplexing optical coupler according to claim 3, wherein the optical filter in close contact with the second end face of the first lens is constituted by a dielectric multilayer film which is directly formed on the second end face of the first lens.

5. The wavelength division multiplexing optical coupler according to claim 2, wherein at least portions of the optical filters belonging to the second optical filter group are dielectric multilayer films and are directly formed at portions of the first end face of the first lens on a side opposed to an end face thereof brought into close contact with the optical filter belonging to the first optical filter group.

6. The wavelength division multiplexing optical coupler according to claim 2, wherein at least portions of the optical filters of the second optical filter group are dielectric multilayer films and are directly formed on the end faces of the respective output optical fibers.

7. The wavelength division multiplexing optical coupler according to claim 2, wherein the input optical fiber and the set of the output optical fibers are held by a holding member having a plurality of fine parallel through holes along a longitudinal direction thereof.

8. The wavelength division multiplexing optical coupler according to claim 1, wherein the second lens is a gradient index rod lens having a third end face corresponding to the third face and a fourth end face corresponding to the fourth face and the optical filter of the first optical filter group arranged to a side mostly proximate to the third end face of the second lens is brought into close contact with the third end face of the second lens.

9. The wavelength division multiplexing optical coupler according to claim 8, wherein the optical filter brought into close contact with the third end face of the second lens is a dielectric multilayer film and is formed directly on the third end face of the second lens.

10. The wavelength division multiplexing optical coupler according to claim 8, wherein at least one of the output optical fibers is held by a holding member having a fine through hole along a longitudinal direction thereof.

11. A wavelength division multiplexing optical coupler comprising:
   an input optical fiber for emitting from an end face a flux of light multiplexed with a plurality of wavelengths;
   a first lens having a first face into which the flux of light emitted from the input optical fiber is input and a second face from which the flux of light converted into a flux of parallel light is emitted;
   first, second and third output optical fibers for multiplexing/demultiplexing three wavelengths, two of which are provided in parallel with the input optical fiber;
   a first optical filter for transmitting fluxes of light having a first and second wavelength and reflecting a flux of light having a third wavelength is directly formed at an second end face corresponding to the second face of the first lens;
   wherein an end face of the third output optical fiber is arranged at a position at which the flux of light having the third wavelength reflected by the first optical filter is focused via the first lens;

a second optical filter for transmitting the flux of light having the first wavelength and reflecting at least the flux of light having the second wavelength, a light incident face of the second optical filter being fixed to the second end face of the first lens brought into close contact with the first filter by angles different from each other relative to the optical axis of the first lens;

wherein an end face of the second output optical fiber is arranged at a position at which the flux of light having the second wavelength reflected by the second optical filter is focused by the first lens via the first optical filter;

a third optical filter for transmitting the flux of light having the third wavelength and reflecting the fluxes of light having the first and second wavelengths is directly formed on at least one of an end face of the third output optical fiber and a first end face corresponding to the first face of the first lens opposed to the end face of the third output optical fiber;

a fourth optical filter for transmitting at least the flux of light having the second wavelength and reflecting the flux of light having the first wavelength is directly formed on at least one of the end face of the second output optical fiber and the first end face of the first lens opposed to the end face of the second output optical fiber;

a second lens having a third face and a fourth face, wherein the second lens is disposed with the third face adjacent to the second face of the first lens, and wherein the second lens focuses light having the first wavelength wherein an end face of the first output optical fiber is arranged on the fourth face at a position at which the flux of light having the first wavelength transmitted through the first and the second optical filters is focused via the second lens.

12. The wavelength division multiplexing optical coupler according to claim 11, wherein the third end face of the second lens on a side opposed to the first lens is provided with a predetermined angle relative to an optical axis of the second lens and the second optical filter is formed directly at the end face of the second lens.

13. The wavelength division multiplexing optical coupler according to claim 11, wherein the three wavelengths respectively include wavelength ranges of 1260 through 1360 nm, 1480 through 1500 nm and 1550 through 1560 nm.

14. A wavelength division multiplexing optical coupler comprising:

an input optical fiber for emitting a flux of light multiplexed with plurality of wavelengths from an end face thereof;

first, second, third and fourth output optical fibers for multiplexing/demultiplexing four wavelengths, three of which are provided in parallel with the input optical fiber;

a first lens in which a first optical filter for transmitting fluxes of light having a first, a second and a third wavelength and reflecting a flux of light having a fourth wavelength is brought into contact with a second end face of the first lens;

a second lens in which a second optical filter for transmitting the flux of light having the first wavelength and reflecting at least the flux of light having that second wavelength is brought into contact with a third end face of the second lens;

an optical filter chip arranged between the end faces of the first and second lenses provided with the first and the second optical filters, the filter chip transmitting the fluxes of light having the first and the second wavelengths and reflecting at least the flux of light having the third wavelength;

wherein light incident faces of the respective optical filters are respectively provided with angles different from each other relative to an optical axis of the first lens;

wherein an end face of the fourth output optical fiber is arranged at a position of which the flux of light having the fourth wavelength reflected by the first optical filter is focused via the first lens;

a fourth optical filter for transmitting the flux of light having the fourth wavelength and reflecting the fluxes of light having the first, the second and third wavelengths is directly formed on at least one of an end face of the fourth output optical fiber and a first end face of the first lens opposed to the end face the fourth output optical fiber;

the second output optical fiber is arranged at a position at which he flux of light having the second wavelength reflected by the second optical filter is focused by transmitting through the optical filter chip and the first optical filter and focused via the fist lens;

a sixth optical filter for transmitting at least the flux of light having the second wavelength and reflecting the flux of light having the first wavelength is directly formed on at least one of an end face of the second output optical fiber and the first end face of the first lens opposed to the end face of the second output optical fiber;

the third output optical fiber is arranged at a position at which the flux of light having the third wavelength reflected by the optical filter chip is transmitted through the first optical filter and focused via the first lens;

a fifth optical filter for transmitting at least the flux of light having the third wavelength and reflecting the fluxes of light having the first and the second wavelengths is directly formed on at least an end face of the third output optical fiber and the first lens opposed to the end face of the third output optical fiber; and wherein an end face if the third output optical fiber is arranged at a position at which the flux of light having the first wavelength transmitted through the first, the second the third optical filters is focused via the second lens.

15. The wavelength division multiplexing optical coupler according to claim 14, wherein the optical filters for the first and the second lenses with filters are dielectric multilayer films and at least either thereof is directly formed at the end face if the lens.

* * * * *